United States Patent [19]

Nagano et al.

[11] Patent Number: 4,554,563
[45] Date of Patent: Nov. 19, 1985

[54] DRIVE SYSTEM IN A MULTI-PIN-ELECTRODE ELECTROSTATIC RECORDING APPARATUS

[75] Inventors: Fumikazu Nagano, Yamatokoriyama; Hiroshi Shirakoshi, Nara, both of Japan

[73] Assignee: Sharp Kabushiki Kaisha, Osaka, Japan

[21] Appl. No.: 531,587

[22] Filed: Sep. 13, 1983

Related U.S. Application Data

[63] Continuation of Ser. No. 200,135, Oct. 24, 1980, abandoned.

[30] Foreign Application Priority Data

Oct. 25, 1979 [JP]  Japan .................. 54-138517

[51] Int. Cl.[4] ........................................... G01D 15/06
[52] U.S. Cl. .................................................. 346/154
[58] Field of Search ................. 346/154, 155; 358/300

[56] References Cited

U.S. PATENT DOCUMENTS 4,297,715 10/1981 Tadauchi et al. ............... 346/154 X

FOREIGN PATENT DOCUMENTS 107209 8/1979 Japan .................................... 346/154

Primary Examiner—Thomas H. Tarcza
Attorney, Agent, or Firm—Birch, Stewart, Kolasch & Birch

[57] ABSTRACT

A multi-pin-electrode electrostatic recording system includes a recording head having 2048 pin electrodes aligned in a line and 65 pairs of auxiliary electrodes positioned near the pin electrodes. A negative recording pulse is applied to a selected pin electrode when a positive recording pulse is applied to a corresponding pair of auxiliary electrodes to form an electrostatic latent image on a dielectric layer of a recording paper. A compensation negative voltage pulse is applied to the auxiliary electrodes, the compensation negative voltage pulse having a pulsewidth longer than the positive recording pulse and the positive recording pulse being superimposed on the compensation negative voltage pulse. By the compensation negative voltage pulse, the occurrence of the ghost image on the non-selected image point is eliminated.

3 Claims, 16 Drawing Figures

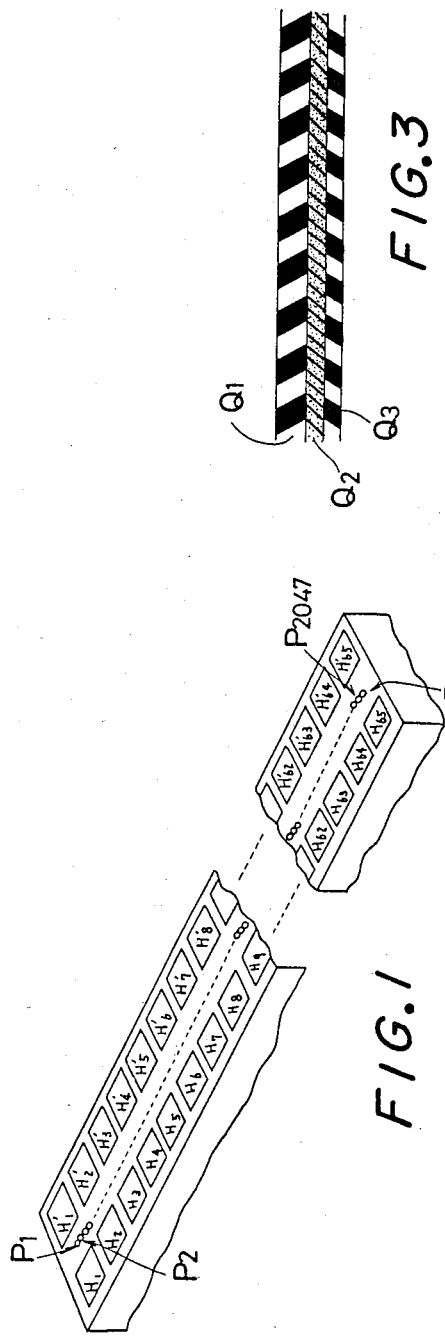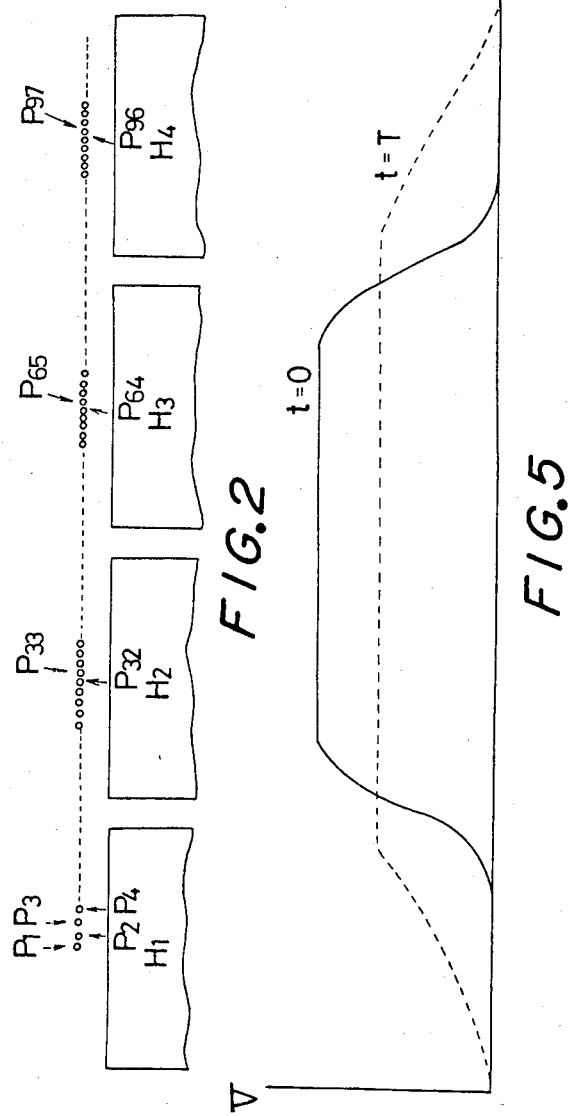

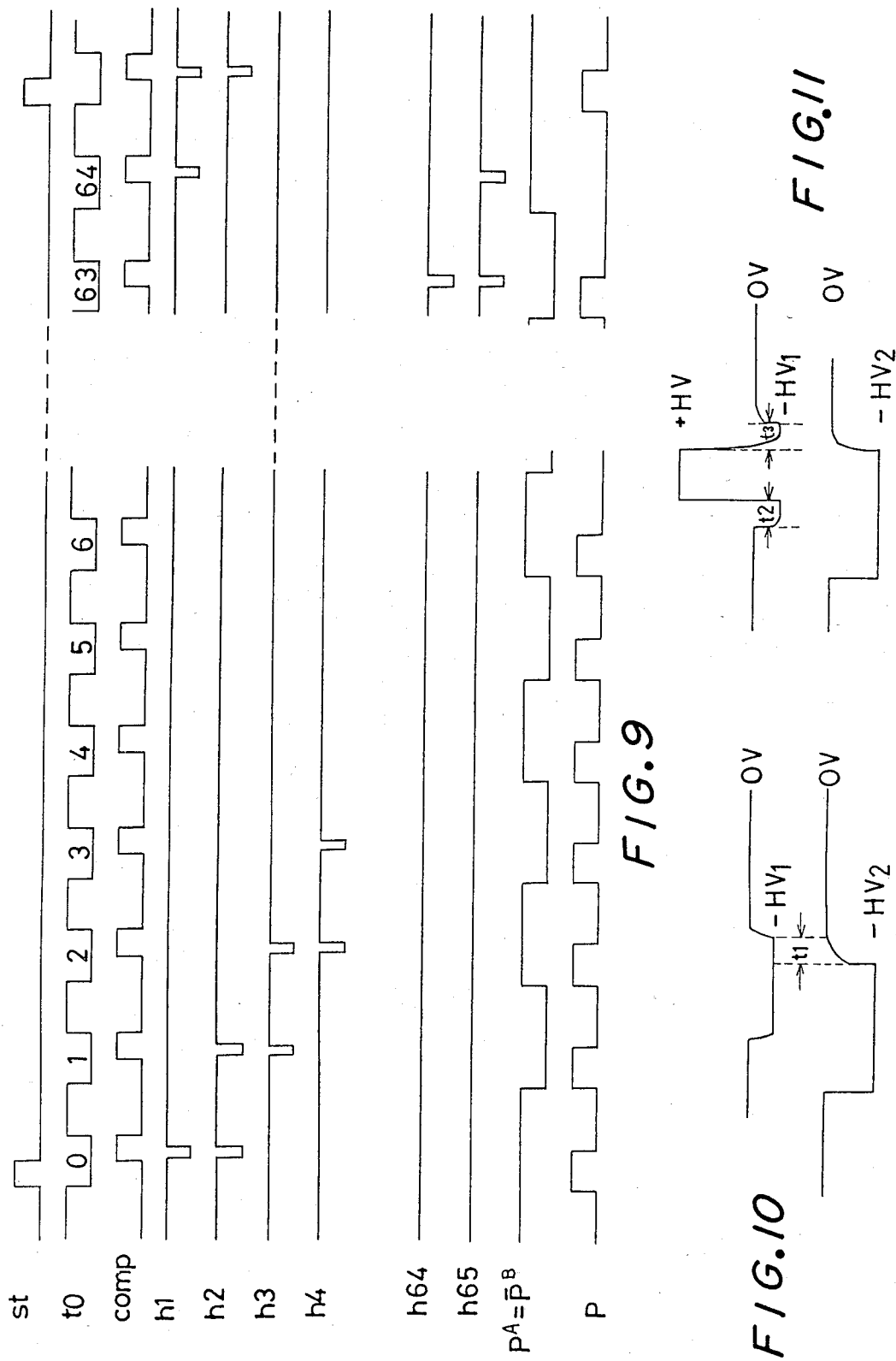

DRIVE SYSTEM IN A MULTI-PIN-ELECTRODE ELECTROSTATIC RECORDING APPARATUS

This application is a continuation, of application Ser. No. 200,135 filed on Oct. 24, 1980 now abandoned.

BACKGROUND AND SUMMARY OF THE INVENTION

The present invention relates to an electrostatic recording system and, more particularly, to a drive system for a multi-pin-electrode electrostatic recording system.

The multi-pin-electrode electrostatic recording system includes a plurality of recording pin electrodes and a plurality of auxiliary electrodes. Recording voltage signals are applied between the recording pin electrodes and the auxiliary electrodes for forming an electrostatic image on a recording paper. In such a multi-pin-electrode electrostatic recording system, there is a possibility that a ghost image could be formed at a nonselected image position.

Accordingly, an object of the present invention is to provide a novel drive system in a multi-pin-electrode electrostatic recording system.

Another object of the present invention is to provide a drive system which prevents occurrence of ghost images in a multi-pin-electrode electrostatic recording apparatus.

Still another object of the present invention is to provide a drive system in a multi-pin-electrode electrostatic recording apparatus for ensuring an accurate recording without regard to humidity conditions.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an auxiliary electrode driver circuit develops a recording voltage of a predetermined voltage level, and a compensation voltage of a polarity opposite to the recording voltage. The compensation voltage is applied to auxiliary electrodes corresponding to nonselected image positions, thereby precluding the occurrence of ghost images.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a schematic perspective view of a recording head employed in an electrostatic recording apparatus of the present invention;

FIG. 2 is an enlarged schematic plan view of a portion of the recording head of FIG. 1;

FIG. 3 is a sectional view of a recording paper used in the electrostatic recording apparatus of the present invention;

FIG. 4 is a waveform chart showing recording voltage signals employed in the conventional electrostatic recording apparatus;

FIG. 5 is a graph showing a potential distribution in the recording paper when the recording voltage signals shown in FIG. 4 are applied to the recording paper of FIG. 3;

FIG. 9 is a time chart showing various signals occurring within the control circuit of FIG. 8;

FIG. 10 is a waveform chart showing recording voltage signals developed from an embodiment of a drive system of the present invention and applied to nonselected image points;

FIG. 11 is a waveform chart showing recording voltage signals developed from an embodiment of a drive system of the present invention and applied to selected image points;

DESCRIPTION OF THE PREFERRED EMBODIMENTS

Figure 6:
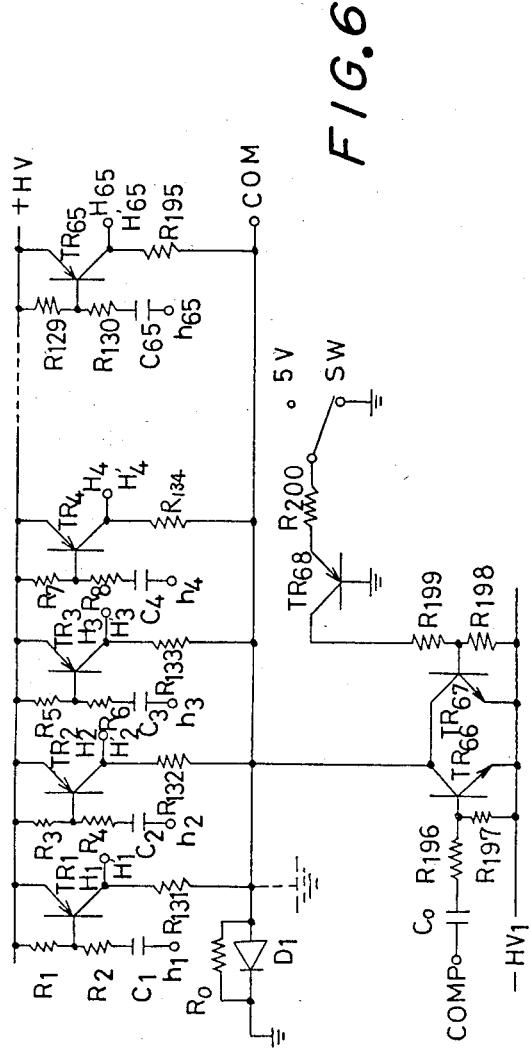
FIG. 6 is a circuit diagram of an auxiliary electrode driver circuit included in an embodiment of a drive system of the present invention.

A multi-pin-electrode recording head comprises, as shown in FIG. 1, multi-pin electrodes $P_1$ through $P_{2048}$, and auxiliary electrodes $H_1$ through $H_{65}$ and $H_1'$ through $H'_{65}$. The auxiliary electrodes $H_1$ and $H'_1$, $H_2$ and $H'_2$, ..., and $H_{65}$ and $H'_{65}$ are connected with each other. Recording voltage signals are applied between a selected pin electrode $P_j$ and corresponding auxiliary electrode pair $H_i$ and $H'_i$ positioned near the selected pin electrode $P_j$.

FIG. 3 shows a recording paper, which comprises a base paper layer $Q_1$, a conductive layer $Q_2$ and a dielectric surface layer $Q_3$. In response to the application of the above-mentioned recording voltage signals, an electrostatic latent image is formed on the recording paper.

That is, the recording operation is based on the charging operation of a preselected charge pattern on the recording paper. Accordingly, the recording operation is greatly influenced by the resistance value of the recording paper. If the resistance value of the recording paper becomes low due to, for example, high humidity, the charging operation is effected on an undesirable position on the paper, which will create a ghost image. Contrarily, if the resistance value of the recording paper becomes high due to, for example, a low humidity, the charging operation is not accurately performed even at a selected position. The present invention is to provide a novel drive system for a multi-pin-electrode electrostatic recording apparatus, which ensures an accurate recording without regard to the humidity variations.

The reason for creating the ghost image in the conventional drive system will be first described with reference to FIGS. 2, 4 and 5.

FIG. 2 shows relationships between the pin electrodes $P_j$ and the auxiliary electrodes $H_i$. As already discussed above, the auxiliary electrodes $H_i$ and $H'_i$ are positioned to sandwich the pin electrodes and are electrically connected with each other. The pin electrodes $P_j$ are divided into 32 blocks, each block comprising 64 pin electrodes. Each block is divided into two groups, namely, a group A and a group B. Moreover, the pin electrodes positioned at corresponding positions in each blocks are commonly connected with each other in the following manner.

GROUP A $P_1 = P_{65} = P_{129} = \ldots = P_{1985} (= P_1^A)$
$P_2 = P_{66} = P_{130} = \ldots = P_{1986} (= P_2^A)$
.
.
$P_3 = P_{96} = P_{160} = \ldots = P_{2016} (= P_{32}^A)$

GROUP B $P_{33} = P_{97} = P_{161} = \ldots = P_{2017} (= P_1^B)$
$P_{34} = P_{98} = P_{162} = \ldots = P_{2018} (= P_2^B)$
.
.
$P_{64} = P_{128} = P_{192} = \ldots = P_{2048} (= P_{32}^B)$ FIG. 4 shows a recording voltage signal employed in the conventional drive system. A positive pulse $+HV$ is applied to the auxiliary electrodes $H_i$, $H'_i$, $H_{i+1}$ and $H'_{i+1}$. A negative pulse $=HV$ is applied to a selected pin electrode $P_j$. FIG. 5 shows a potential distribution in the conductive layer $Q_2$ of the recording paper when the recording voltage signal as shown in FIG. 4 is applied to the recording head. In FIG. 5, the potential level is shown along the ordinate axis, and the electrode location is shown along the abscissa axis. The solid line shows the potential distribution when the application of the positive pulse $+HV$ is initiated ($t=0$), and the broken line shows the potential distribution at a time when a period of time T has passed from the initiation of the positive pulse $+HV$ ($t=T$). It will be clear from FIG. 5 that a potential increase is observed at a time $t=T$ at the auxiliary electrode position adjacent to the auxiliary electrode to which the positive pulse $+HV$ is applied. Therefore, there is a possibility that a ghost image is formed at pin electrodes $P_{j\pm64}$, because the pin electrodes $P_{j\pm64}$ receive the same negative pulse $-HV$ as the selected pin electrode $P_j$.

Figure 7:
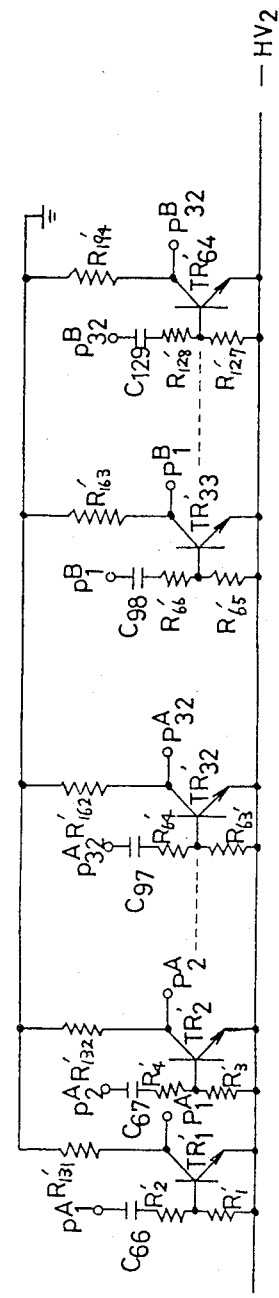
FIG. 7 is a circuit diagram of a pin electrode driver circuit included in an embodiment of a drive system of the present invention.
Figure 8:
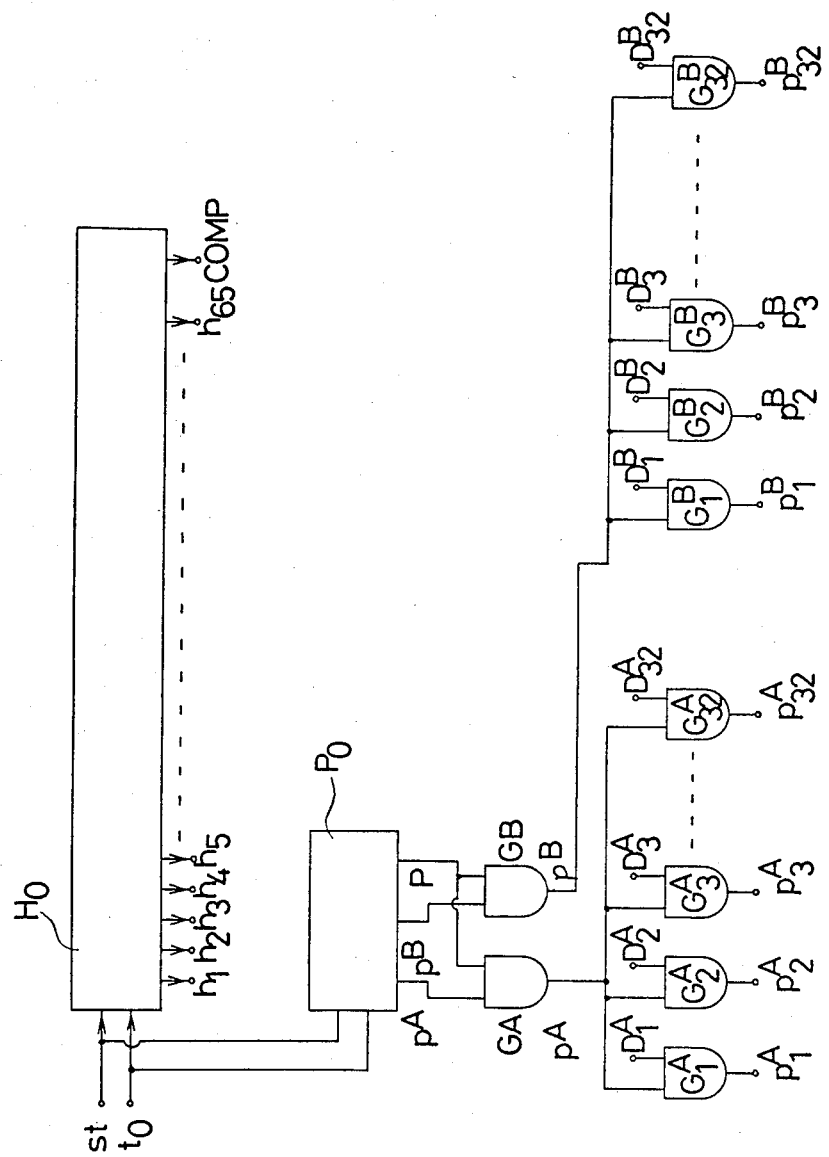
FIG. 8 is a block diagram of a control circuit included in an embodiment of a drive system of the present invention.

FIGS. 6, 7 and 8 show an embodiment of a drive system of the present invention. FIG. 6 shows an auxiliary electrode driver circuit, FIG. 7 shows a pin electrode driver circuit, and FIG. 8 shows a control circuit for developing control signals to be applied to the auxiliary electrode driver circuit and the pin electrode driver circuit.

The auxiliary electrode driver circuit comprises a plurality of voltage signal generation circuits connected to each of the auxiliary electrodes $H_1$ through $H_{65}$ ($H'_1$ through $H'_{65}$). The voltage signal generation circuits are connected to a power source line $+HV$ and a common line COM. Each of the voltage signal generation circuits are connected with each other in a parallel fashion. For example, the voltage signal generation circuit for the auxiliary electrodes $H_1$ and $H'_1$ comprises resistors $R_1$ and $R_2$, a capacitor $C'_1$, a driver transistor $TR_1$ and a resistor $R_{131}$. A control signal $h_1$ developed from the control circuit of FIG. 8 is applied to the base electrode of the driver transistor $TR_1$ through the capacitor $C_1$ and the resistor $R_2$. The collector electrode of the driver transistor $TR_1$ develops the recording voltage signal to be applied to the auxiliary electrodes $H_1$ and $H'_1$.

In the conventional system, the common line COM is grounded as shown by the broken line in FIG. 6. This will create the ghost image. In the auxiliary electrode driver circuit of the present invention, as shown in FIG. 6, the common line COM is connected to a parallel circuit comprising a diode $D_1$ and a resistor $R_0$. Moreover, a circuit is provided for swinging the common line COM to a predetermined negative level. That is, the common line COM is connected to a negative level source line $-HV_1$ via a transistor $TR_{66}$ or a transistor $TR_{67}$. The base electrode of the transistor $TR_{66}$ is connected to receive a compensation control pulse signal COMP derived from the control circuit of FIG. 8 via a capacitor $C_0$ and resistors $R_{196}$ and $R_{197}$. That is, in response to the development of the compensation control pulse signal COMP, the common line COM is swung to the negative level $-HV_1$. The transistor $TR_{67}$ is provided for improving the recording characteristics at the low humidity condition. At the normal humidity condition and the high humidity condition, a selection switch SW is connected to a ground level terminal. At the low humidity condition, the selection switch SW is connected to a positive level terminal of 5V. The selection switch SW is connected to a transistor $TR_{68}$ through a resistor $R_{200}$. The transistor $TR_{68}$ controls the swiching operation of the transistor $TR_{67}$ via resistors $R_{198}$ and $R_{199}$. Accordingly, the common line COM is connected to the negative level source line $-HV_1$ when the selection switch SW is connected to the positive level terminal of 5V in the low humidity condition.

The pin electrode driver circuit comprises a plurality of voltage signal generation circuits connected to each of the pin electrode groups $P_1^A$ through $P_{32}^A$, and $P_1^B$ through $P_{32}^B$. Each voltage signal generation circuit is connected between the ground level line and a negative level line $-HV_2$. For example, the voltage signal generation circuit for the pin electrode group $P_1^A$ comprises a driver transistor $TR_1'$ connected to the negative level line $-HV_2$ and the ground level line via a resistor $R'_{131}$. The base electrode of the driver transistor $TR'_1$ is connected to receive a control signal $P_1^A$ developed from the control circuit of FIG. 8 via resistors $R'_1$ and $R'_2$ and a capacitor $C_{66}$. The collector electrode of the driver transistor $TR'_1$ develops the recording voltage signal to be applied to the pin electrode group $P_1^A$.

As discussed above, the control circuit of FIG. 8 develops the control signals $h_i$, $p_j^A$ and $p_k^B$. An auxiliary electrode control circuit $H_0$ comprises a shift register, gate circuits and monostable multivibrators for developing the control signals $h_1$ through $h_{65}$ and the compensation control pulse signal COMP, as shown in FIG. 9, in response to a start pulse St and a base clock pulse $t_0$ applied thereto. A pin electrode control circuit $P_0$ comprises a flip-flop circuit and a monostable multivibrator for developing timing pulses $P^A$, $P^B$ and P, as shown in FIG. 9, in response to the start pulse St and the base clock pulse $t_0$. The timing pulses $P^A$, $P^B$ and P are applied to gate circuits GA and GB which develop timing pulses $p^A$ for the group A and $p^B$ for the group B, respectively. The timing pulse $p^A$ is applied to one input terminal of AND gates $G_1^A$ through $G_{32}^A$.

The other input terminal of the AND gates $G_1^A$ through $G_{32}^A$ receives data signals $D_1^A$ through $D_{32}^A$ derived from a data source, thereby forming control signals $p_1^A$ through $p_{32}^A$. The timing pulse $p^B$ is applied to AND gates $G_1^B$ through $G_{32}^B$ in order to form the control signals $p_1^B$ through $P_{32}^B$ in combination with data signals $D_1^B$ through $D_{32}^B$.

By applying the control signals $h_1$ through $h_{65}$ and the compensation control pulse signal COMP to the auxiliary electrode driver circuit of FIG. 6, and the control signals $p_1^A$ through $p_{32}^A$ and $p_1^B$ through $p_{32}^B$ to the pin electrode driver circuit of FIG. 7, a drive voltage waveform as shown in FIG. 10 is applied between a nonselected auxiliary electrode and a selected pin electrode, and a drive voltage waveform as shown in FIG. 11 is applied between a selected auxiliary electrode and a selected pin electrode. That is, in accordance with the drive system of the present invention, the common line is shifted to the negative voltage level $-HV_1$ as compared with the conventional drive waveform of FIG. 4.

Figure 12:
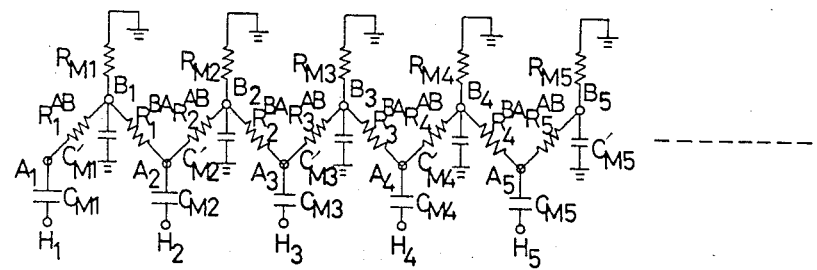
FIG. 12 is an equivalent circuit showing recording conditions for explaining operation modes of the drive system of the present invention.

FIG. 12 is an equivalent circuit showing relationships between the pin electrode group, the auxiliary electrode and the recording paper. $C_{M1}, C_{M2}, \ldots$ represent capacitances created between sample points $A_1, A_2, \ldots$ in the conductive layer $Q_2$ of the recording paper and the auxiliary electrodes $H_1, H_2, \ldots$, respectively. The sample points $A_1, A_2, \ldots$ are selected at the following points.

$A_1 \ldots$ slightly above the pin electrode $P_1$ in FIG. 2;
$A_2 \ldots$ slightly above the pin electrodes $P_{32}$ and $P_{33}$ in FIG. 2; $\ldots$ Sample points $B_1, B_2, \ldots$ are selected at the following points.

$B_1 \ldots$ slightly above the pin electrodes $P_{16}$ and $P_{17}$ in FIG. 2;
$B_2 \ldots$ slightly above the pin electrodes $P_{48}$ and $P_{49}$ in FIG. 2; $\ldots$ $R_{M1}, R_{M2}, \ldots$ represent resistance values determined by the grounding condition of the base paper layer $Q_1$ of the recording paper. $R_1^{AB}, R_1^{BA}, R_2^{AB}, R_2^{BA} \ldots$ represent resistance values between points $A_1$ and $B_1$, $B_1$ and $A_2$, $A_2$ and $B_2$, $B_2$ and $A_3$, $\ldots$. In the normal condition, $R_{M1}, R_{M2}, \ldots$ are greater than $R_1^{AB}, R_1^{BA}, R_2^{AB}, \ldots$. These resistance values become small as the humidity becomes high. Capacitances $C'_{M1}, C'_{M2}, \ldots$ are introduced to explain the potential distributions, the capacitances being connected between the ground level and the sample points $B_1, B_2, \ldots$. In the actual operation mode, the capacitances $C'_{M1}, C'_{M2}$ can be considered as the capacitances formed between the sample points $B_1, B_2, \ldots$ and the nearest pin electrodes, respectively.

Since the electrodes are formed in a repeating fashion, the above-mentioned resistance values and capacitances satisfy the following relationships.

$$R_{M1} \simeq R_{M2} \simeq R_{M3} \simeq \ldots$$

$$R_1^{AB} \simeq R_1^{BA} \simeq R_2^{AB} \simeq R_2^{BA} \simeq \ldots$$

$$C_{M1} \simeq C_{M2} \simeq C_{M3} \simeq \ldots$$

$$C'_{M1} \simeq C'_{M2} \simeq C'_{M3} \simeq \ldots$$

Moreover, $$C_{M1} >> C'_{M1}$$

$$R_{M1} > R_1^{AB}$$

If the system is operated as the electrostatic recording apparatus in the normal temperature and the normal humidity, the following relationships are satisfied.

$$C_{M1} \cdot R_1^{AB} > \text{several tens } \mu\text{sec.}$$

$$C'_{M1} \cdot R_1^{AB} < 1 \ \mu\text{sec.}$$

Figure 13:
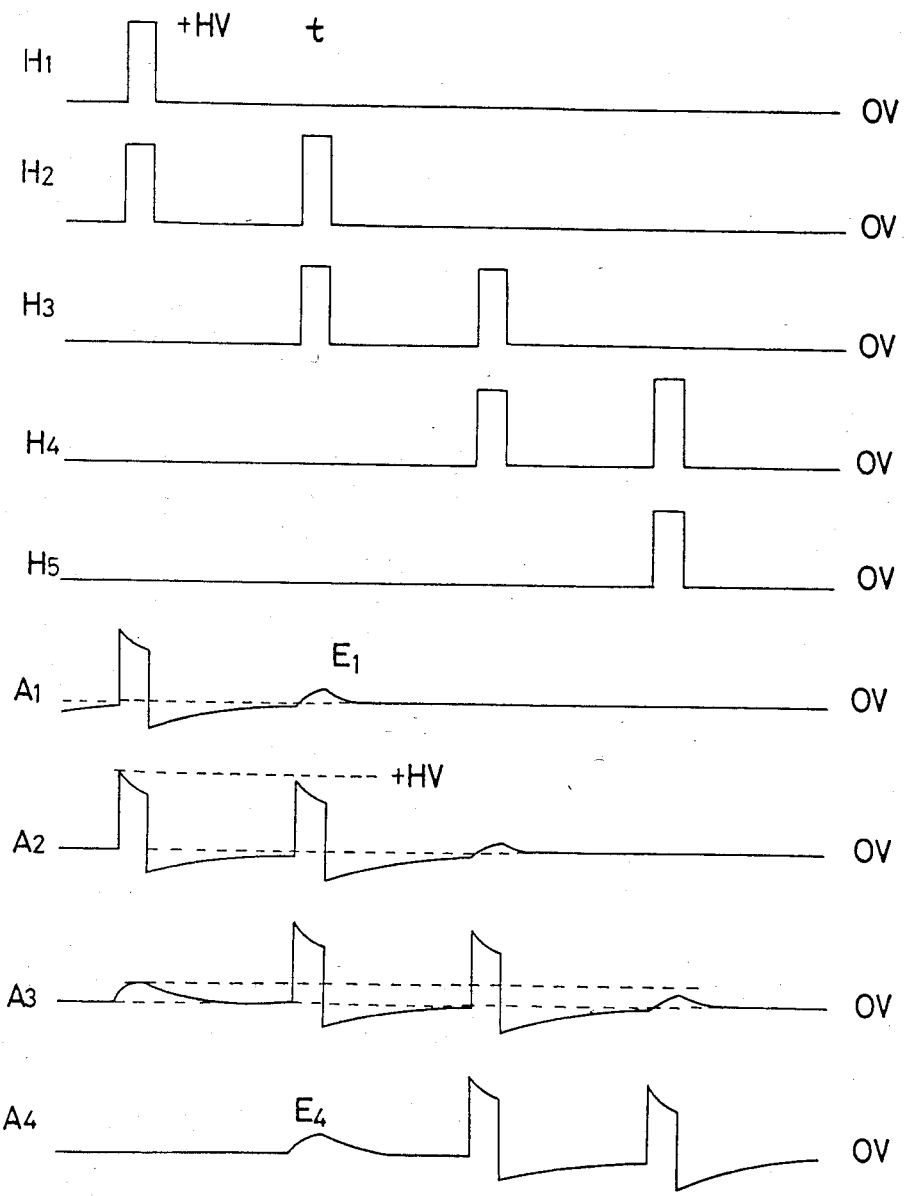
FIG. 13 is a waveform chart for explaining an operation mode of the conventional drive system.

FIG. 13 shows the potential distributions when the conventional drive pulse, having the pulsewidth of about 10 $\mu$sec, is applied to the auxiliary electrodes to record information on the recording paper which has the characteristics as shown in FIG. 12.

$H_1, H_2, \ldots$ represent drive pulses sequentially applied to the auxiliary electrodes $H_1, H_2, \ldots$. The drive pulses of $+HV$ are applied to the adjacent two auxiliary electrodes at the same time because a group of pin electrodes is provided over the adjacent two auxiliary electrodes. The potential as shown in FIG. 13 is created at the sample points $A_1, A_2, \ldots$ due to the above-mentioned resistances and capacitances. The thus created potential forms a leak potential toward the ajdacent image points. It will be clear from FIG. 13 that two drive pulses are subsequently applied to one auxiliary electrode. The second drive pulse is applied to the auxiliary electrode at a time when the potential condition is still influenced by the first drive pulse. Accordingly, the potential level generated in the conductive layer $Q_2$ by the second drive pulse is slightly lower than that generated by the first drive pulse. Moreover, the potential level at the adjacent point, which is caused by the leak potential, is higher at the point adjacent to the point where the first drive pulse is applied than the point adjacent to the point where the second drive pulse is applied.

More specifically, the drive pulse is applied to the auxiliary electrodes $H_2$ and $H_3$ at a time t. Since the auxiliary electrode $H_3$ receives the first drive pulse and the auxiliary electrode $H_2$ receives the second drive pulse, the leak potential $E_4$ at the point $A_4$ is higher than the leak potential $E_1$ at the point $A_1$. Therefore, the ghost image is generated between points $A_4$ and $B_4$. The potential distributions at the points $B_1, B_2 \ldots$ can be represented as follows in the $\mu$sec order because $C'_{M1} \cdot R_1^{AB} < 1 \ \mu$sec at the normal temperature and the normal humidity.

$$B_1 \simeq \frac{A_1 + A_2}{2}$$

$$B_2 \simeq \frac{A_2 + A_3}{2}$$

Figure 14:
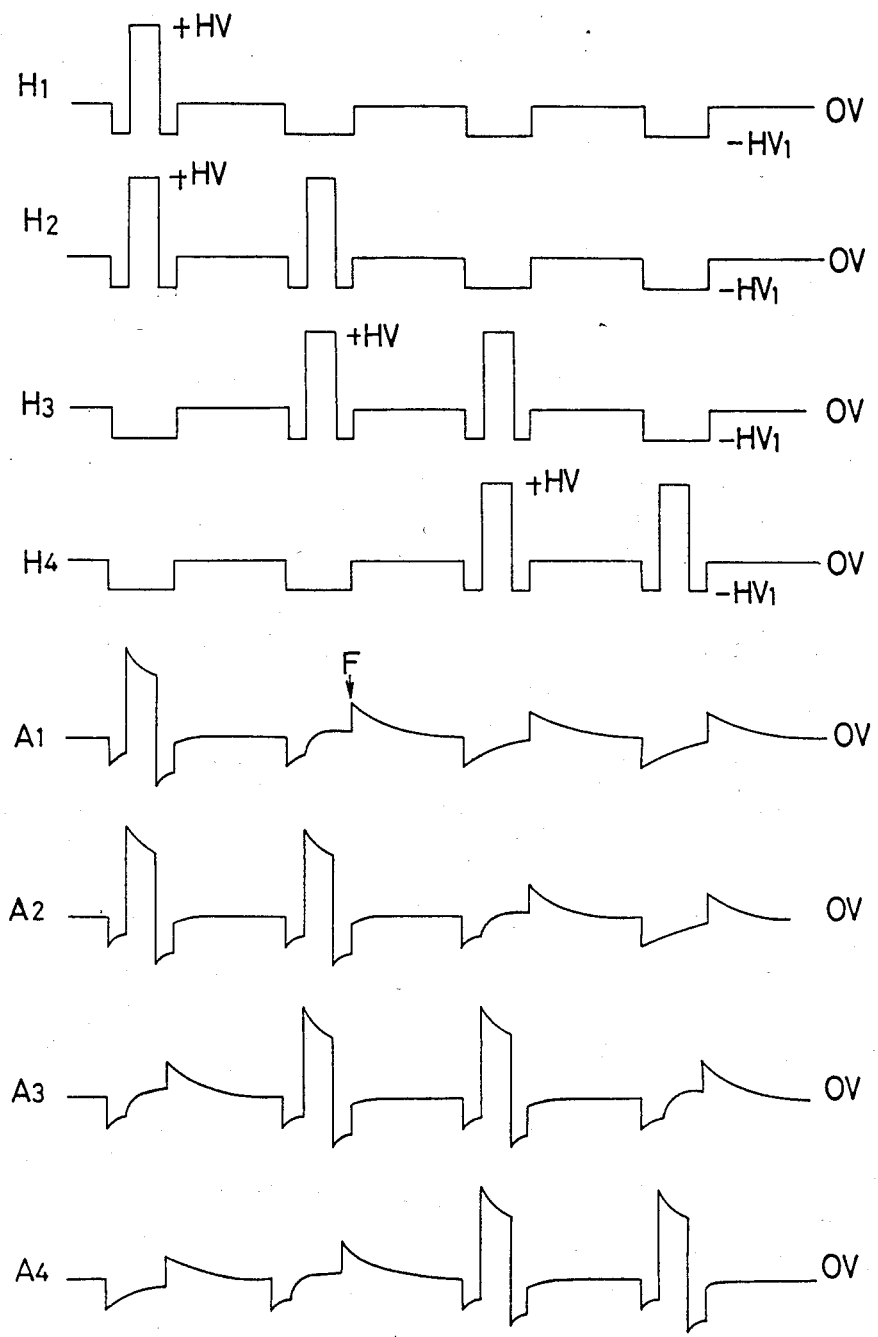
FIG. 14 is a waveform chart for explaining an operation mode of the drive system of the present invention.

FIG. 14 shows the potential distributions when the drive pulse of the present invention is applied to the auxiliary electrodes to record information on the recording paper.

In the present drive system, the recording voltage $+HV$ is applied to the auxiliary electrodes after the auxiliary electrode is swung to the negative level by the compensation voltage pulse $-HV_1$. Accordingly, the absolute potential level caused by the leak potential is smaller than the conventional system. This will eliminate the occurrence of the ghost image. However, it will be clear from FIG. 14 that a positive potential appears at the trailing edge of the negative pulse $-HV_1$ (see the point F). Therefore, the drive voltage signals must be selected so that the drive voltage pulse applied to the pin electrode disappears before the time at which the trailing edge of the negative pulse $-HV_1$ appears at the auxiliary electrode.

Figure 15:
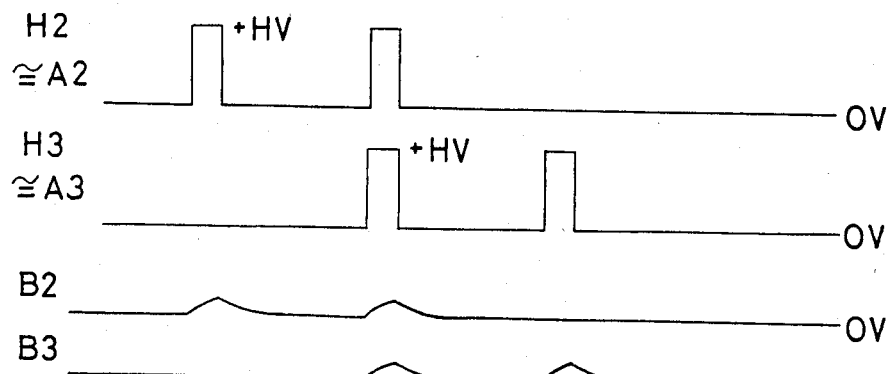
FIG. 15 is a waveform chart for explaining another operation mode of the conventional drive system.

As already discussed above, in the low humidity condition, the charging operation is not accurately performed. At the low humidity condition, the resistance value of the recording paper becomes high and, therefore, $C'_{M1} \cdot R_1^{AB} >$ several $\mu$secs. If the auxiliary electrode is driven, under these conditions, by the convention drive pulses, the accurate charging operation is not performed by the drive pulses of the pulsewidth of about 10 $\mu$sec. FIG. 15 shows the potential distributions when the conventional drive pulses are applied to the auxiliary electrodes under the low humidity condition. Even when the drive pulses of pulsewidth of about 10 $\mu$sec are applied to the auxiliary electrodes, the potentials at the sample points $B_2$ and $B_3$ never reach the level for initiating the discharge.

Figure 16:
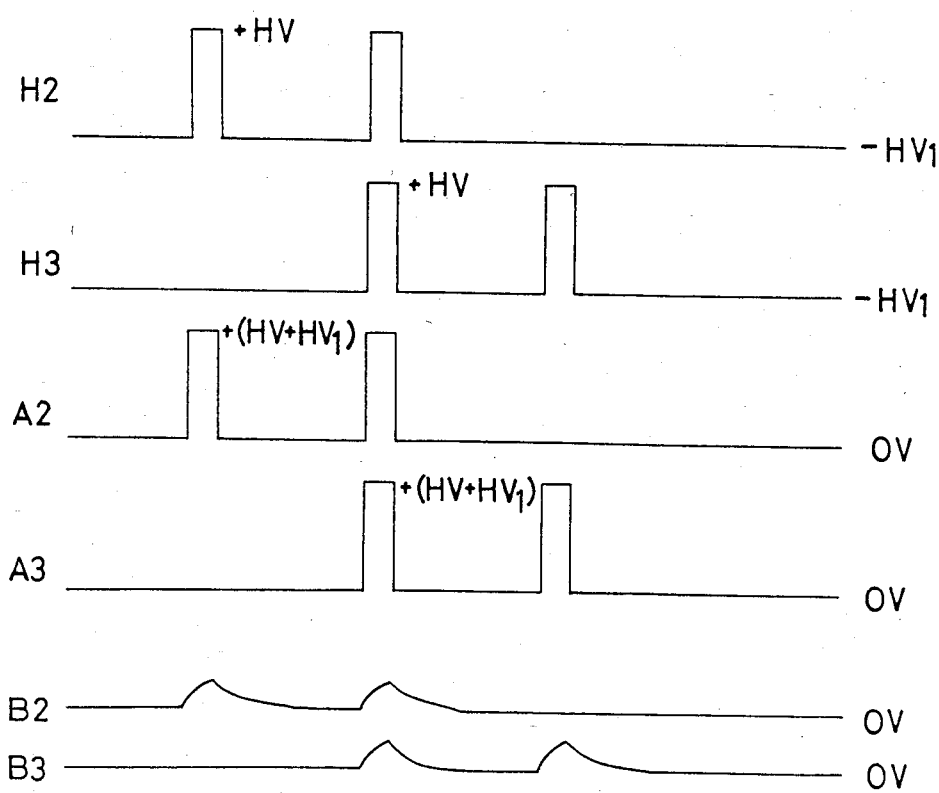
FIG. 16 is a waveform chart for explaining another operation mode of the drive system of the present invention.

However, if the selection switch SW in the present drive system of FIG. 6 is inclined to the positive level terminal of 5V, the transistors $TR_{67}$ and $TR_{68}$ are held in the ON conditions. Therefore, the drive pulse to be applied to the auxiliary electrode is swung between the negative level $-HV_1$ and the positive level $+HV$ as shown in FIG. 16. The sample points $A_2$ and $A_3$ receive the voltage pulses $+(HV+HV_1)$. This will improve the voltage application to the sample points $B_2$ and $B_3$. In this way, the accurate charging is ensured even in the low humidity condition. The selection switch SW in FIG. 6 can be the manual selection switch or the automatic selection switch responding to either the detected humidity or the detected resistance value of the recording paper.

The invention being thus described, it will be obvious that the same may be varied in many ways. Such variations are not to be regarded as a departure from the spirit and scope of the invention, and all such modifications are intended to be inlcuded within the scope of the following claims.

What is claimed is:

1. Means for driving a multi-pin-electrode recording head of an electrostatic recording system, said recording head including a plurality of pin electrodes and auxiliary electrodes positioned adjacent said pin electrodes, said means for driving comprising:
   first means for applying a select voltage of a first polarity to a selected said pin electrode;
   second means for applying an enable voltage having a polarity opposite said first polarity to said auxiliary electrode adjacent said selected pin electrode to produce a net voltage therebetween sufficient to form an electrostatic image on a dielectric layer of recording paper; and
   third means for applying a compensation voltage to each of said auxiliary electrodes, said compensation voltage having said first polarity and being of sufficient magnitude to prevent the undesired formation of an electrostatic ghost image at undesired points.

2. The driving system of claim 1 wherein said enable voltage applied to said auxiliary electrode adjacent to said selected pin electrode is superimposed on said compensation voltage.

3. The driving system of claim 2 wherein said select, enable and compensation voltages are pulse voltages, said enable voltage pulse being of a shorter duration than said compensation voltage pulse.

* * * * *